Dec. 11, 1962   R. P. NIRENBERG ET AL   3,067,608
MACHINE FOR TESTING BATTING MATERIALS
Filed Feb. 29, 1960

INVENTORS
ROBERT P. NIRENBERG
THOMAS L. RUSK, JR.
BY
ATTORNEY

United States Patent Office 3,067,608
Patented Dec. 11, 1962

3,067,608
MACHINE FOR TESTING BATTING MATERIALS
Robert P. Nirenberg, New York, and Thomas L. Rusk, Jr., New Rochelle, N.Y., assignors, by mesne assignments, to Monsanto Chemical Company, a corporation of Delaware
Filed Feb. 29, 1960, Ser. No. 11,741
2 Claims. (Cl. 73—94)

The present invention concerns a machine for testing batting composed of fibrous or other materials. In particular it relates to a device for measuring the thickness and resiliency of pillows.

For certain purposes it is desirable to determine the average thickness of a pillow, particularly when filled with a batt composed of fibrous materials. It is also desirable to determine the thickness under various loads. There is no type of gauge known which will permit determination of the average thickness of such a structure without taking a prohibitive number of measurements. Also, since normal use of a pillow involves applying a concentrated load to a small portion of the area of the pillow, it is desirable to simulate the shape and weight of a human head to determine how the stuffing material reacts to the application and removal of the load.

Accordingly, it is an object of the invention to provide an improved method of determining the average useful thickness of batting from the arithmetical average of a few simple measurements which are easily and quickly made.

It is another object of the invention to provide an improved method of determining the average useful thickness of a pillow from the arithmetical average of only four measurements which are easily and quickly made.

It is still another object of the invention to provide a machine in which measurements of the average useful thickness and the degree of recovery of a pillow can be made with accuracy and precision. Other objects and advantages of the instant invention will be apparent from the description thereof hereinafter.

In general, the objects of the present invention are accomplished by providing a baseplate, a number of vertical members attached by suitable means to said baseplate, a top plate extending between the vertical members and adapted for reciprocating movement along said vertical members, indicating means responsive to the movement of said top plate, and a simulated headpiece attached to the top plate.

In order to more clearly understand the following detailed description of the invention, as well as its operation, reference should be had to the accompanying drawing which illustrates a practical preferred embodiment of the invention and which is in no way intended in a limitative sense.

Figure 1:
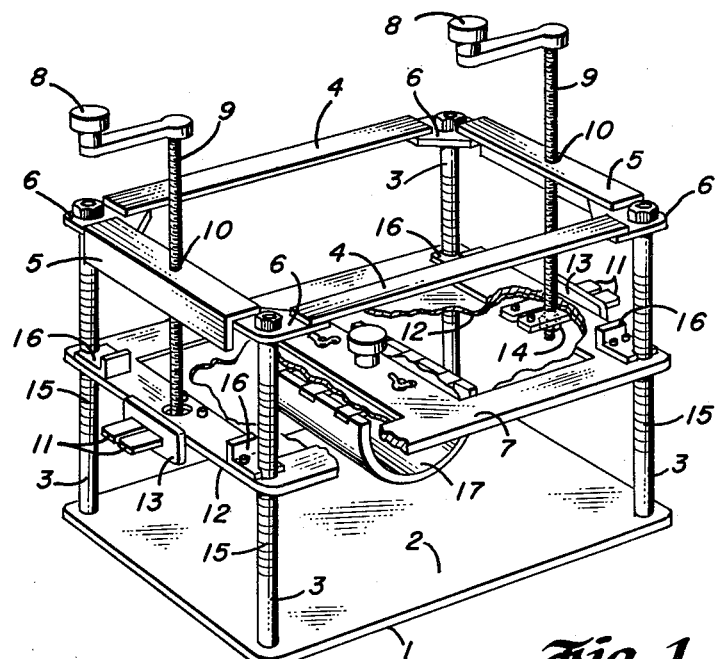

In the drawing:
FIGURE 1 is a perspective, partly in section, of one preferred embodiment of the invention, and
FIGURE 2 is a fragmentary bottom view of a portion of the device.

Referring to the figures of the drawing, FIGURE 1 shows a preferred form of machine comprising a baseplate 1, having a flat upper contact face 2 which may be rectangular in shape, with a post 3 vertically attached to the baseplate 1 at each corner thereof. Crossbeams 4 and angle braces 5 parallel to the baseplate 1 join the upper extremities of the posts 3 optionally by means of corner pieces 6, and form a rigid framework for the machine. A top plate 7, adapted for reciprocating movement along the posts 3 by means of smooth bore holes, is positioned parallel to the baseplate 1. Suitable control means, such as handcranks 8, are attached to threaded adjusting bolts 9 which are threaded through angle braces 5 at 10. Positioned directly beneath each adjusting bolt 9 is a holding device comprising a pair of members 11 pivotally attached to the lower contact face 12 of the top plate 7 and adapted to be held in engagement by a collar 13 which encloses the free ends of the members 11. The opposed sides of the members 11 are adapted to form a circular opening when the members 11 are held together by the collar 13. The threaded adjusting bolts 9 extend through this circular opening and terminate with a nut 14 positioned beneath the members 11 in such a manner that the members 11 rest on the nut 14 when held in engagement to support the top plate 7. The handcranks 8 may function to raise or lower the top plate 7 which may be disengaged from the adjusting bolts 9 by releasing the members 11. The posts are provided with a scale 15 calibrated in appropriate units so that sliding pointers 16 mounted at the four top corners of the top plate 7 when moved into contact with said posts 3 correctly indicate the distance between the lower contact face 12 of the top plate 7 and the upper contact face 2 of the baseplate 1. The simulated headpiece 17 is cut from stock, preferably cylindrical stock, and is mounted on the lower contact face 12 of the top plate 7 and equidistant from the four corners thereof. Said headpiece is provided with suitable mounting means, optionally comprising a plurality of support braces fixedly attached to the simulated headpiece 17 and held to the top plate 7 by a plurality of fasteners such as a hand setscrew and/or a number of wing nuts.

Figure 2:
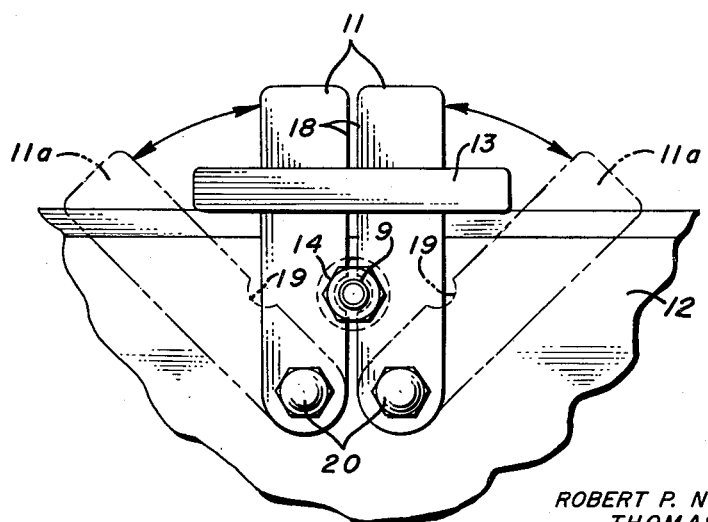

FIGURE 2 shows a holding device comprising the complementary members 11, with the opposed sides 18 thereof provided with opposed semicircular notches 19 which form a circular opening when members 11 are held together by collar 13. The diameter of the opening is sufficient to encompass the adjusting bolts 9. The members 11 are attached to the top plate 7 by pivot bolts 20 which permit said members to be rotated in opposition to one another after removal of the collar 13, thus allowing the top plate 7 to be disengaged from the adjusting bolts 9. The members 11 may be disengaged from attachment with the adjusting bolts 9 by removal of the collar 13 allowing the members 11 to be moved to position 11a (dotted line). The top plate 7 may then be lowered for purposes of the test to be performed.

Operation of the machine is as follows. Before the batting material to be tested is placed in the machine, top plate 7 with simulated headpiece 17 attached is raised by adjusting the handcranks 8 until the distance between the upper contact face 2 of baseplate 1 and the lower surface of the simulated headpiece 17 is such that the batting material to be tested may be easily inserted. The sample to be tested is centered on baseplate 1. The top plate 7 is then lowered by moving members 11 to position (dotted line) 11a which allows the top plate 7 to move downward along the posts 3 until it contacts the sample. A controlled downward movement using the members 11 as handles is preferred over a free fall in order to more closely approximate the velocity of the force applied by the human head. As soon as all motion of the top plate has creased, including any upward motion caused by "spring-back" or expansion of the fibers, the pointers 16 are moved into contact with the posts 3. A reading is taken from the calibrated scale 15 on each post 3 and the arithmetical average of the total number of readings indicates the average thickness of the fibers in a compressed state. The test may be repeated several times to insure greater acuracy in the determinations, and to disclose any possible loss of resiliency with repeated application of the load. After each thickness test the top plate 7 may be raised to a position of rest by engaging members 11 around each adjusting bolt 9. This enables the degree of recovery of the fiber, caused by its inherent resiliency, to be observed and recorded.

The dimensions of the top plate and the baseplate may be varied to any size that will permit easy insertion of the stock to be tested without it being distorted by the posts. The size of the simulated headpiece is not critical, although the present dimensions, 5.63" by 8", approximate those of a human head. The weight of the top plate with the headpiece attached is adjustable by the use of additional weights fabricated in such shape that the top plate may be evenly loaded. Any suitable number of posts or braces, may be employed in the practice of the invention.

Use of this invention permits rapid determination of the thickness of various types of batting materials under a variety of conditions which may be reproduced accurately at any time. Reproducibility of the measurements obtained is good and not primarily dependent upon the skill of the operator.

It is to be understood that the drawing and description are merely intended to be illustrative and that changes and variations may be made without departing from the spirit and scope of the invention as defined in the appended claims.

We claim:

1. A machine for measuring the thickness and compressibility of batting comprising a horizontal baseplate, four posts fixedly attached to said baseplate and extending vertically upward therefrom, a framework comprising four crossbeams fixedly attached near the upper extremities of the posts by means of corner pieces, a top plate extending between the posts and parallel to the baseplate, said top plate being adapted for reciprocating movement along the posts by having smooth bore holes drilled therein, two handcranks attached by suitable means to two threaded adjusting bolts which by means of threaded openings are passed through opposite crossbeams, said adjusting bolts having retaining nuts at their lower extremities on which the top plate rests by means of holding devices comprising a pair of members pivotally attached to the lower contact face of the top plate, each member having a straight opposed side which is provided with an opposed semicircular notch to form a circular opening, when in contact, through which said adjusting bolts pass, four sliding pointers attached at the four top corners of the top plate and directed toward the posts which are provided with a scale calibrated in appropriate units, and a simulated headpiece of suitably sized cylindrical stock attached to the lower side of the top plate.

2. A machine for measuring the thickness and compressibility of batting comprising a horizontal baseplate, four posts fixedly attached to said baseplate and extending vertically upward therefrom, a framework comprising four cross beams fixedly attached near the upper extremities of the posts by means of corner pieces, a top plate extending between the posts and parallel to the baseplate, said top plate being adapted for reciprocating movement along the posts by having smooth bore holes near each corner thereof, two handcranks attached by setscrews to two threaded adjusting bolts which by means of threaded openings are passed through opposite crossbeams, said adjusting bolts having retaining nuts at their lower extremities on which the top plate rests by means of a pair of members pivotally attached to the top plate, each member having a straight side which is provided with a semicircular notch to form a circular opening, when in contact, through which said adjusting bolts pass, four sliding pointers attached at the four top corners of the top plate and directed toward the posts so that when moved into contact with said posts the pointers correctly indicate the distance between the lower surface of a simulated headpiece attached to the top plate and the upper contact face of the baseplate on the posts which are provided with a scale calibrated in appropriate units, said simulated headpiece optionally comprising an appropriately sized unit of cylindrical stock suitably mounted on the lower contact face of the top plate, said cylindrical stock unit being mounted equidistant from the four corners of said top plate.

References Cited in the file of this patent

UNITED STATES PATENTS

| | | |
|---|---|---|
| 754,297 | Freysleben | Mar. 8, 1904 |
| 882,731 | Alexander | Mar. 24, 1908 |
| 2,156,877 | Simpson et al. | May 2, 1939 |
| 2,352,836 | Hertel | July 4, 1944 |